United States Patent Office 2,724,078
Patented Nov. 15, 1955

2,724,078

SELENIUM RECTIFIERS

Robert F. Durst, Orange, Gerald C. Florio, Montclair, and Donald W. Black, Pompton Plains, N. J., assignors to International Telephone and Telegraph Corporation, a corporation of Maryland No Drawing. Application December 29, 1951,
Serial No. 264,274

3 Claims. (Cl. 317—241)

This invention relates to improvements in selenium rectifiers, and more particularly to the introduction of a novel lacquer as a barrier layer between the selenium and counter-electrode layers of such rectifiers.

It is believed that the effective rectifying characteristics of dry rectifiers, such as a selenium rectifier, largely depends upon the formation of a so-called barrier layer between the layer of selenium and the applied counter-electrode, the latter generally consisting of a cadmium-containing alloy. This barrier layer is strengthened by the "forming" of the rectifier, which comprises applying a voltage to the same in the reverse, or poorly conducting direction for a period of time.

It has been found that the effective rectifying characteristics of such selenium rectifiers can be improved by interposing an artificial barrier layer, for example, by the deposition of a lacquer on the selenium before the application of the counter-electrode. Lacquers for this purpose which have been proposed previously have contained a wide variety of constituents, some of which have resulted in rectifiers of somewhat improved characteristics.

One of the more recent developments respecting the type of lacquer to be introduced into the selenium rectifiers is the "nylon" type lacquer proposed by D. W. Black in his co-pending application Serial No. 253,612, filed October 29, 1951, now Patent No. 2,660,698. The use of this type of lacquer has resulted in the consistent production of 36 volt rectifier plates having excellent aging characteristics. For practical purposes it has the disadvantage of requiring an exceedingly large forming time.

Other lacquers have been proposed utilizing as an ingredient selenium dioxide ($SeO_2$) in various proportions either as selenium dioxide per se, such as in Geisler 2,197,497 or percentages of 5% or higher as in the lacquers of the various Saslaw Patents 2,386,750, 2,426,242, and 2,433,402.

It is an object of the present invention to provide a new lacquer for use as an artificial barrier layer giving to the rectifier the high voltage and improved aging characteristics resulting from the "nylon" type lacquer proposed by Mr. D. W. Black, as aforesaid, but at the same time decreasing the required forming time to more practicable limits. By the term "nylon" as used here in the specification and in the claims, reference is being made to a high molecule weight linear polymeric carbonamide soluble in the lower aliphatic alcohols, such as, for example, that designated as FM–6501 by the du Pont Corporation. FM–6501 Nylon is soluble in phenols and lower aliphatic alcohols. The lower alcohols, methanol and ethanol, are the best solvents; normal propanol and isopropanol have good solvency for these nylons, but are inferior to methanol and ethanol in this respect. Solutions containing up to 30% nylon can be prepared by warming the resins in any of these alcohols. Water, hydrocarbons, and ketones are miscible with these solutions to the extent of about 25% of the total solvent. The use of 20–30% water actually improves solution characteristics.

Solutions tend to gel on prolonged storage but can be made fluid again on warming. Gelation time depends on temperature, resin concentration, and on the particular resin solvent used.

This nylon resin is insoluble in most solvents, including aromatic and aliphatic hydrocarbons, halogenated hydrocarbons, ketones, esters, water, and carbon disulfide. The resin is particularly resistant to hydrocarbon solvents, showing negligible swelling or change of any kind on prolonged exposure to either aliphatic or aromatic hydrocarbons.

This object is attained by adding to the said "nylon" lacquer a certain percentage of selenium dioxide in the amounts and in the manner more fully specified below.

As is more fully described in the said co-pending application Serial No. 253,612 of D. W. Black, a novel lacquer is proposed as the artificial barrier layer for use in selenium rectifiers comprising broadly a polyamide a high molecular weight linear polymeric carbonamide, especially one soluble in the lower aliphatic alcohols to which is added as a carrier a nitro-paraffin. The resulting solution is then treated by adding thereto ammonium hydroxide in an amount sufficient to raise the normal pH of the composition of 5 to a value of approximately 7. After the counter-electrode is applied, the rectifier is then formed, preferably in oil.

In the above proposal the proportions between the polyamide and the carrier are approximately 1 to 40. The preferred form of lacquer is the following:

Nylon (FM–6501) concentrate (Proportions by weight):
    4%–7% nylon (high molecular weight linear polymeric carbonamide)
    65%–75% isopropyl alcohol
    10%–16% water
    7%–12% furfuryl alcohol Carrier (Proportions by volume):

1½–4½ parts isopropyl alcohol
    ½–1½ parts nitro-methane

As previously explained, a rectifier embodying the above lacquer with its pH adjusted to a preferred value of about 7 will, under proper forming conditions, consistently result in a 36 volt plate with excellent aging characteristics. However, the forming time required is of such length that mass production of such rectifiers becomes uneconomical.

Although, as also previously mentioned, selenium dioxide has been proposed as an addition to barrier layers or as the barrier layer per se to improve the general voltage characteristics of selenium rectifiers, it has always been thought necessary to utilize such selenium dioxide in relatively large proportions.

We have discovered that the forming time necessary to produce a 36 volt rectifier plate can be reduced by many hours if very small amounts of selenium dioxide are added to the "nylon" type barrier layer discussed above, without disturbing the resultant high voltage and excellent aging characteristics of the rectifier. Actual tests prove that the addition of $SeO_2$ in the amounts indicated can actually cut the forming time to one-third to one-half of the time necessary without such addition. To effect this result we have also discovered that the required amounts of selenium dioxide are not only smaller than previously proposed for other purposes but the proportions are relatively critical. In contrast to the use of selenium dioxide in proportions of 5% or greater in accordance with prior art suggestions, the forming time for the "nylon" type lacquer is unexpectedly greatly decreased by adding to the lacquer, selenium dioxide in the amounts of 0.01% to 1%. If the selenium dioxide is added in amounts greater than 1%, the aging characteristics of the rectifier fall off rapidly whereas if the addition is less than ¼%, the forming time starts to increase again.

Accordingly, in accordance with the present invention the selenium dioxide is added to the carrier in the ratio of ¼ to 1 gram of selenium dioxide to 100 parts by volume of the carrier, the proportion between the carrier and the nylon concentrate remaining the same as hereinbefore discussed and preferably the pH of the composition being controlled as described.

While we have described above the principles of our invention in connection with certain specific examples of compositions, it is clearly understood that this description is made only by way of example and not as a limitation on the scope of our invention as set forth in the objects thereof and in the accompanying claims.

What is claimed:

1. In a rectifier having a base plate, a layer of selenium on the base plate, a counter-electrode layer on the selenium, and an intermediate layer between the selenium and the counter-electrode comprising a solution of a high molecular weight linear polymeric carbonamide soluble in the lower aliphatic alcohols together with a nitro-paraffin, said nitro-paraffin containing ¼% to 1% $SeO_2$.

2. In the process of making a selenium rectifier the step comprising covering the selenium with a lacquer comprising 10 cc. of a solution consisting essentially of 2 grams of soluble high molecular weight linear polymeric carbonamide soluble in the lower aliphatic alcohols and 30 grams of isopropyl alcohol, 6 grams of water and 4 grams of furfuryl alcohol and 400 cc. of a solvent for said solution consisting essentially of 3 parts by volume of isopropyl alcohol to 1 part of nitro-methane said solvent including ¼% to 1% $SeO_2$.

3. A rectifier having a base plate, a layer of selenium on the base plate, a counter electrode layer on the selenium and an intermediate layer consisting of the end products of the evaporation of a solution consisting essentially of a high molecular weight linear polymeric carbonamide soluble in the lower aliphatic alcohols together with a nitro-paraffin, said nitro-paraffin containing ¼% to 1% $SeO_2$.

References Cited in the file of this patent

UNITED STATES PATENTS

| Number | Name | Date |
|---|---|---|
| 2,320,088 | Leekley | May 25, 1943 |
| 2,386,750 | Saslaw | Oct. 16, 1945 |
| 2,426,242 | Saslaw | Aug. 26, 1947 |
| 2,433,402 | Saslaw | Dec. 30, 1947 |

OTHER REFERENCES

Polyamide Resin Suspensoids, General Mills Inc., October 20, 1950.

Dutch Abstract, C. A. 44, 7587—May 1950.